United States Patent

Mika et al.

(10) Patent No.: US 7,412,300 B2
(45) Date of Patent: Aug. 12, 2008

(54) THERMAL FORMING

(75) Inventors: David Peter Mika, Clifton Park, NY (US); Michael Evans Graham, Slingerlands, NY (US); Wenwu Zhang, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 203 days.

(21) Appl. No.: 11/364,233

(22) Filed: Feb. 27, 2006

(65) Prior Publication Data

US 2007/0023944 A1    Feb. 1, 2007

Related U.S. Application Data

(60) Provisional application No. 60/704,180, filed on Jul. 27, 2005.

(51) Int. Cl.
*G06F 19/00* (2006.01)
(52) U.S. Cl. ............. 700/166; 700/159; 219/121.6; 148/610
(58) Field of Classification Search .......... 700/159, 700/166; 250/492.1; 148/112, 121, 508, 148/510, 639; 219/121.6
See application file for complete search history.

(56) References Cited

U.S. PATENT DOCUMENTS

| 6,410,884 | B1 | 6/2002 | Hackel et al. | |
| 6,415,639 | B1 * | 7/2002 | Kilian et al. | 72/342.1 |
| 6,662,063 | B2 * | 12/2003 | Hunter et al. | 700/100 |
| 6,850,812 | B2 * | 2/2005 | Dinauer et al. | 700/166 |
| 7,254,459 | B2 * | 8/2007 | Tateno | 700/165 |
| 2005/0133485 | A1 | 6/2005 | Tokura | |

FOREIGN PATENT DOCUMENTS

| WO | 03/011493 | 2/2003 |
| WO | 03/066383 | 8/2003 |
| WO | 2005/005069 | 1/2005 |

OTHER PUBLICATIONS

Liwen et al "FEM Simulation of laser forming process of shipbuilding steel plate"—J. Phys. IV France 120 (2004).*

* cited by examiner

*Primary Examiner*—Alexander J Kosowski
(74) *Attorney, Agent, or Firm*—Penny A. Clarke (57) ABSTRACT

Briefly, in accordance with one or more embodiments, one or more thermal forming treatments may be predicted to achieve a desired shape and/or microstructure in a workpiece.

17 Claims, 2 Drawing Sheets

THERMAL FORMING

CROSS-REFERENCE TO RELATED APPLICATION(S)

This application claims the benefit of U.S. Provisional Application Ser. No. 60/704,180, filed on Jul. 27, 2005, titled "STRAIN-BASED THERMAL FORMING PROCESS SYNTHESIS" by David P. Mika, et al.

GOVERNMENT LICENSE RIGHTS

The U.S. Government has a paid-up license in this invention and the right in limited circumstances to require the patent owner to license others on reasonable terms as provided for by the terms of contract No. 70NANB2H3031 awarded by ATP.

BACKGROUND

Thermal forming of components with laser energy is evolving into a viable manufacturing technology with commercial applications spanning diverse domains such as high-volume automotive part production, microelectronic device fabrication and shape tuning turbomachinery airfoils.

Thermal forming allows non-contact or die-less forming by the judicious application of heat to a workpiece. The deformation of the workpiece is permanent or "plastic" and may be retained even after subsequent heat-treatments. The potential uses of the thermal forming technology become clearer when considering circumstances where forming with dies are cumbersome, costly, inadequate, and/or time consuming. Thermal forming may be a reasonable alternative in cases where use of dies presents one or more of these shortcomings.

BRIEF DESCRIPTION OF DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Additionally, reference is made in the following detailed description to the accompanying drawings which form a part hereof wherein like numerals may designate like parts throughout, and in which is shown by way of illustration specific embodiments that may be realized. It is to be understood that other embodiments may be utilized and structural and/or logical changes may be made without departing from the scope of the claimed subject matter. It should also be noted that directions and references, for example, up, down, top, bottom, and so on, may be used to facilitate the discussion of the drawings and are not intended to restrict the application of the claimed subject matter. Therefore, the following detailed description is not to be taken in a limiting sense and the scope of the claimed subject matter defined by the appended claims and their equivalents.

Reference throughout this specification to "one embodiment" or "an embodiment" means that a particular feature, structure, or characteristic described in connection with the embodiment is included in at least one embodiment of the claimed subject matter. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
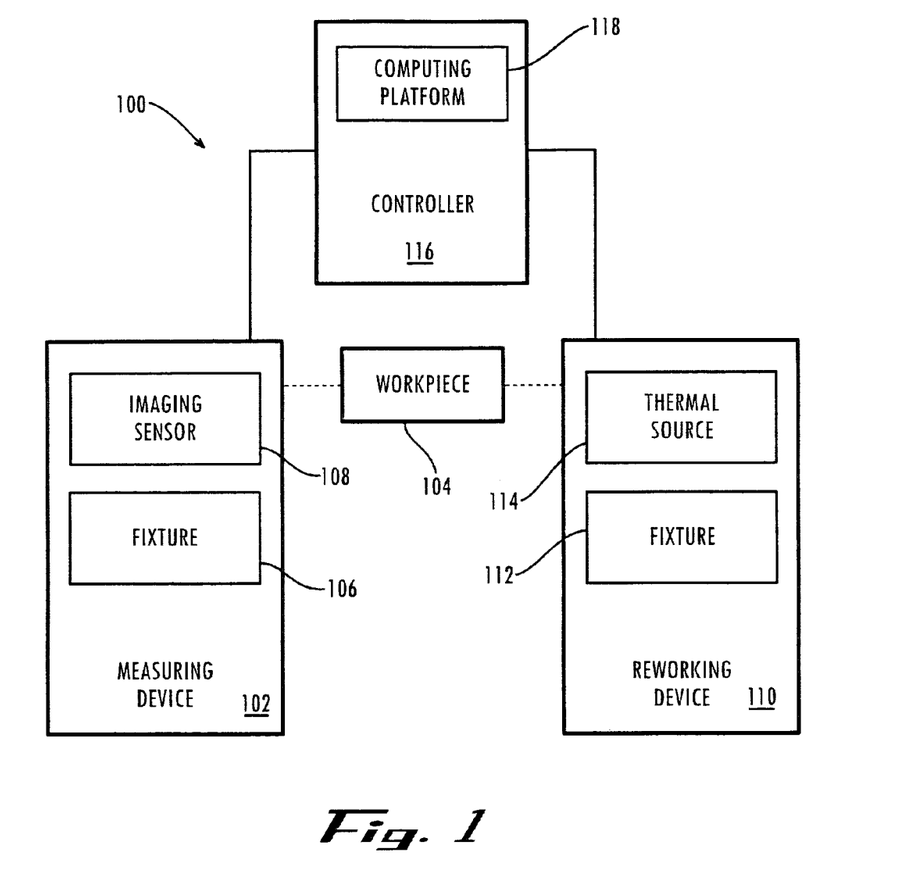
FIG. 1 is a block diagram illustrating an example thermal forming system, in accordance with one or more embodiments.

Referring to FIG. 1, a block diagram illustrates a thermal forming system 100 according to one or more embodiments, although the claimed subject matter is not limited in scope in this respect. Thermal forming system 100 may include more components than those shown in FIG. 1. However, generally conventional components may not be shown. Illustrated in FIG. 1, thermal forming system 100 may include a measuring device 102. Measuring device 102 may be operatively associated with a workpiece 104. The workpiece 104 may be any suitable workpiece capable of being modified through a thermal forming treatment, according to the particular application. Examples of suitable workpieces 104 may include, but are not limited to an airfoil blade, or the like, although the scope of the claimed subject matter is not limited in this respect.

Measuring device 102 may be any device suitable to measure at least the surface of workpiece 104 to obtain spatial position data of workpiece 104, according to the particular application. For example, measuring device 102 may be capable of taking measurements of workpiece 104 to allow a three dimensional model of the workpiece 104 to be constructed. This three dimensional model may be a complete model of the workpiece 104 or a model of a particular surface of the workpiece 104. Measuring device 102 may include a fixture 106. Fixture 106 may be capable of positioning workpiece 104 so that measurements may be taken relative to a fixed reference frame that is substantially similar for multiple workpieces 104.

Measuring device 102 may include an imaging sensor 108. Imaging sensor 108 may be any device suitable to sense at least the surface of workpiece 104 for measurement, according to the particular application. Examples of suitable imaging sensors 108 may include, but are not limited to optical-based measurement systems, laser-based point determination methods, automated mechanical measurement using coordinate measuring machines (CMMs), simple hand measurement, or the like, although the scope of the claimed subject matter is not limited in this respect.

Thermal forming system 100 may include a reworking device 110. Reworking device 110 may share common parts with measuring device 102 or may be a separate unit. Reworking device 110 may be any device suitable to deliver one or more thermal forming treatments to workpiece 104. Examples of suitable reworking devices 110 may include, but are not limited to laser forming devices, laser shock peening devices, shot peening devices, or the like, although the scope of the claimed subject matter is not limited in this respect.

Reworking device 110 may include a fixture 112. Fixture 112 may be capable of holding workpiece 104 relative to a thermal source 114 during one or more thermal forming treatments on workpiece 104. Thermal source 114 may be capable of heating a deviation region on workpiece 104 in order to correct the deviation region.

Thermal forming system 100, measuring device 102 and/or reworking device 110 may be at least partially controlled by a controller 116. Controller 116 may include one or more computing platforms 118. Computing platform 118 may be coupled to measuring device 102 and/or reworking device 110. Computing platform 118 may be capable of exchanging electronic data with one or more components of controller 116, for example, although the scope of the claimed subject matter is not limited in this respect. Thermal forming system 100 may include software executing on computing platforms 118, although the scope of the claimed subject matter is not limited in this respect.

In operation, thermal forming system 100 may measure at least a portion of the initial shape of workpiece 104. This measured initial shape may be compared with a desired shape to calculate deviations. Next, a simulation may yield a predicted thermal forming treatment to achieve a desired shape and/or microstructure in workpiece 104. The predicted thermal forming treatment may be checked for suitability. Reworking device 110 may be directed to perform the predicted thermal forming treatment on workpiece 104. Alternatively or additionally, an iterative process of measuring and treating may be employed to maintain quality, reducing sensitivity to microstructural and geometric variations.

Figure 2:
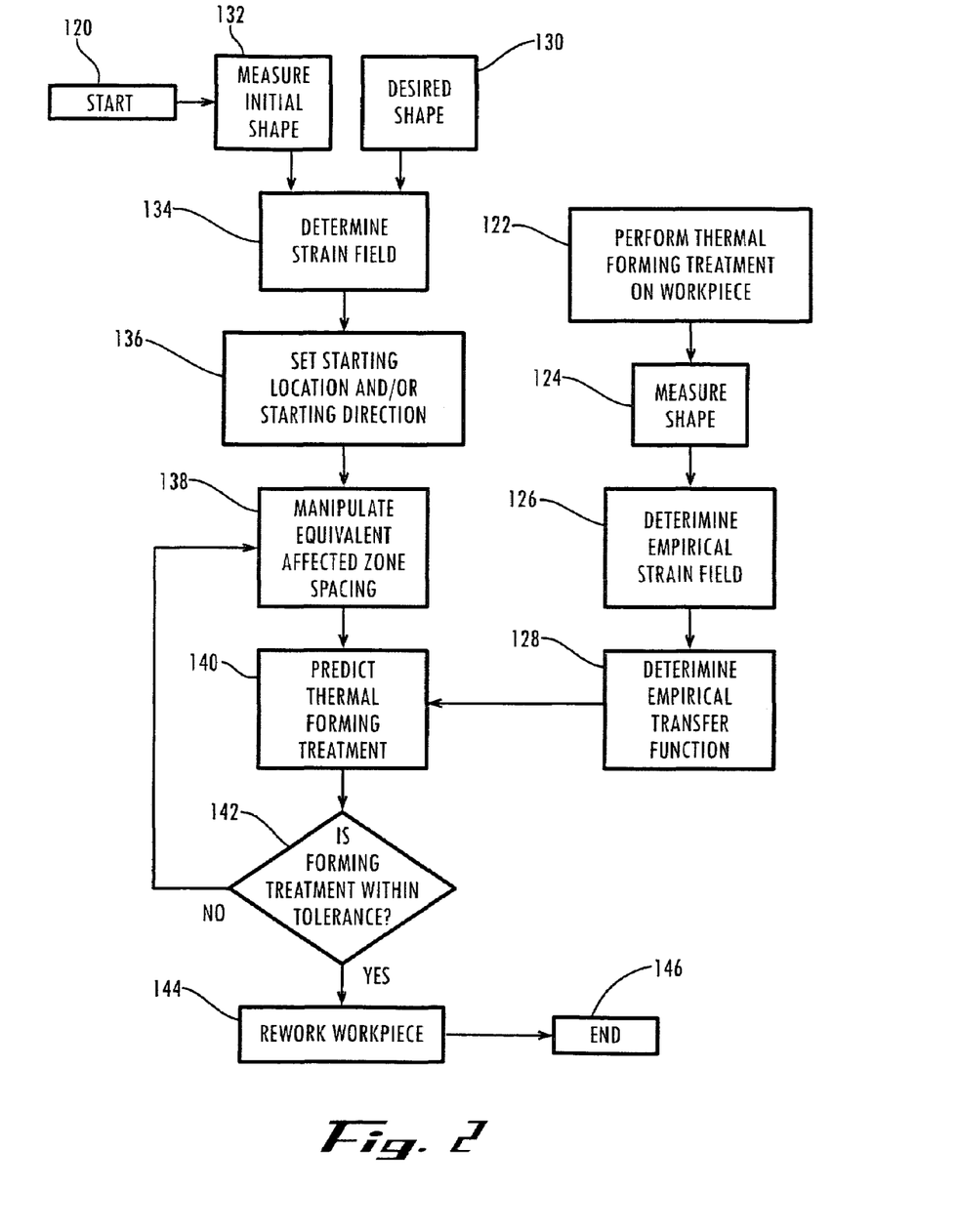
FIG. 2 is a flow diagram illustrating an example procedure for thermal forming, in accordance with one or more embodiments.

Referring now to FIG. 2, an example procedure for thermal forming, in accordance with one or more embodiments, is illustrated by a flowchart, although the claimed subject matter is not limited in scope in this respect. The flowchart illustrated in FIG. 2 may be used to substantially perform one or more thermal forming operations in a thermal forming system 100, such as system 100 of FIG. 1, for example, although the claimed subject matter is not limited in this respect. Additionally, the order in which the blocks are presented does not necessarily limit the claimed subject matter to any particular order. Likewise, intervening additional blocks not shown may be employed without departing from the scope of the claimed subject matter.

The flowchart depicted in FIG. 2 may in alternative embodiments be implemented in software, hardware and/or firmware, and may comprise discrete operations starting at block 120, and which for example may be executed at least in part by computing platform 118 of FIG. 1. At block 122 a thermal forming treatment may be performed on at least one test workpiece. At block 124 at least the surface of a test workpiece may be measured to obtain a deformed shape of said workpiece due to the performed thermal forming treatment. At block 126 a strain field may be determined based at least in part on comparing an untreated shape of said test workpiece to the deformed shape of the test workpiece. At block 128 the determined empirical strain field may be utilized to form an empirical transfer function. The empirical transfer function may relate one or more process inputs to bend angle based at least in part on said empirical strain field. The process inputs may include, but are not limited to one or more of the following: thermal power, thermal spot size, thermal scan velocity, scan path, workpiece thickness, or affected zone spacing, or combinations thereof. The empirical strain field and/or empirical transfer function may be utilized in an inverse style model, where the inverse style model may be capable of predicting one or more thermal forming treatments capable of achieving a desired workpiece shape and/or microstructure. As will be described below, the prediction of one or more thermal forming treatments may include calculating one or more of the following: thermal power, thermal spot size, thermal scan velocity, scan path, or affected zone spacing, or combinations thereof, based at least in part on said empirical transfer function.

One example of such an inverse style model may include inputting a desired shape for a workpiece at block 130. At block 132 at least the surface of a workpiece may be measured to obtain an initial shape of said workpiece. At block 134 a strain field may be determined based at least in part on comparing the initial shape of said workpiece to the desired shape of said workpiece. At block 136 a starting location and/or a starting direction for a thermal forming treatment may be set. For example, a location of maximum compressive strain may be determined based at least in part on the strain field. A starting location for a thermal scan trajectory may be based at least in part on the location of maximum compressive strain. Additionally or alternatively, a starting direction for a thermal scan trajectory may be based at least in part on the location of maximum compressive strain.

At block 138 an equivalent affected zone spacing may be manipulated during the prediction of one or more thermal forming treatments. For example, the prediction of one or more thermal forming treatments may include using an equivalent measure, wherein the equivalent measure may include one or more of the following: equivalent curvature, equivalent bend angle, equivalent local strain, or equivalent affected zone spacing, or combinations thereof. Such an equivalent measure may be manipulated during the prediction of one or more thermal forming treatments. The prediction of one or more thermal forming treatments may include calculating one or more of the following: thermal power, thermal spot size, thermal scan velocity, scan path, or affected zone spacing, or combinations thereof, based at least in part on a guessed equivalent affected zone spacing.

At block 140 one or more thermal forming treatments may be predicted for a workpiece to achieve a desired shape and/or microstructure in the workpiece based at least in part on the determined strain field from block 134. Additionally or alternatively, one or more thermal forming treatments may be predicted for a workpiece to achieve a desired shape and/or microstructure in the workpiece based at least in part on the determined empirical strain field from block 126 and/or the empirical transfer function from block 128. Further, the prediction of one or more thermal forming treatments may include simultaneously calculating two or more or the following: affected zone spacing, thermal scan trajectory, or heating conditions, or combinations thereof.

At block 142 predicted thermal forming treatments may be analyzed to determine if the particular thermal forming treatment is within certain tolerances. If the predicted thermal forming treatment is not within certain tolerances, the equivalent affected zone spacing may be manipulated at block 138 and/or a new thermal forming treatment predicted at block 140. If the predicted thermal forming treatment is not within certain tolerances, the predicted thermal forming treatment may be utilized to rework the workpiece at block 144. The process may end at block 146.

A generalized empiric-numeric approach to determine thermal forming induced strain fields is outlined below including example results with the nickel-based alloy 718, a widely used alloy in aerospace applications. The resulting empirical transfer fictional may be used in devising thermal forming treatments such as path planning strategies for forming workpieces.

As discussed above, the thermal energy may be administered by a number of sources. The thermal energy may be applied to a wide variety of workpieces, including, but not limited to large structures such as bridges, airframes, or the like and/or small micro-components such as found in microelectronic device fabrication, or the like. The thermal energy can be predictably and repeatedly delivered via robotic and/or galvanometric-based systems and hard tooling may be reduced to simple holding fixtures. Additionally or alternatively, optical metrology systems can be used to determine and monitor part configuration before during and after thermal forming treatment to monitor results.

One example workpiece may be compressor blades. With these blades, even with modern six-sigma controls in place in the existing manufacturing environment, process variation in the final tollgate may exceed acceptable limits and blades may be manually "tuned" to meet specifications. Thermal forming treatment may be used to perform a shape tuning on these blades.

As discussed above, one or more thermal forming treatments may be predicted based at least in part on a quantified empirical relationship between process inputs including, but not limited to: thermal power, thermal spot size, thermal scan velocity, scan path, workpiece thickness, or affected zone spacing, or combinations thereof, and process outputs including, but not limited to: microstructural evolution and deformation characteristics. Additionally or alternatively, one or more thermal forming treatments may be predicted to achieve a desired outcome in shape. Several methodologies may be used to quantify the relationship between process inputs and shape change. The outcome may be a resultant shape of the workpiece, quantified by bend angle and strain distributions. The methodology may include a combined empiric-numeric approach performed on test coupons in a designed experiment (DOE), as will be discussed in an example described below.

In the following example, test workpiece 104 comprised alloy 718 coupons cut from rolled stock; heat treated and subsequently tumbled in abrasive media to yield a starting microstructure and surface finish resembling a forged/formed blade. The coupon dimensions were one of 0.100, 0.064, 0.025-inch thick by 2.2 by 1.0 inch. In the example, thermal source 114 comprised a 2 kW max power Nd:YAG laser argon gas laser. The performing of a thermal forming treatment on a workpiece at block 122 comprised the lasing of coupons under argon gas coverage under the 50 DOE conditions listed in Table 1 below.

TABLE 1

Lasing conditions and selected results for coupon DOE

| Test | Thickness | Spot Size | Velocity | Power | Integrand | Angle |
|---|---|---|---|---|---|---|
| T01_S50A | 0.025 | 5.0 | 126 | 1270 | 0.034640 | 0.036907 |
| T02_S50A | 0.025 | 5.0 | 178 | 1270 | 0.009280 | 0.011525 |
| T03_S55A | 0.025 | 5.5 | 144 | 1268 | 0.010000 | 0.009809 |
| T04_S55A | 0.025 | 5.5 | 195 | 1272 | 0.010080 | 0.009599 |
| T05_S60A | 0.025 | 6.0 | 125 | 1265 | 0.007440 | 0.007365 |
| T06_S60A | 0.025 | 6.0 | 171 | 1258 | 0.004880 | 0.004468 |
| T07_S60A | 0.025 | 6.0 | 199 | 1258 | 0.009280 | 0.008011 |
| T08_S50A | 0.025 | 5.0 | 126 | 1270 | 0.036160 | 0.035517 |
| T09_S50A | 0.025 | 5.0 | 178 | 1270 | 0.014080 | 0.013893 |
| T10_S55A | 0.025 | 5.5 | 144 | 1272 | 0.017920 | 0.017034 |
| T11_S55A | 0.025 | 5.5 | 195 | 1272 | 0.006000 | 0.005899 |
| T12_S60A | 0.025 | 6.0 | 125 | 1270 | 0.010400 | 0.009617 |
| T13_S60A | 0.025 | 6.0 | 171 | 1272 | 0.013520 | 0.011781 |
| T14_S60A | 0.025 | 6.0 | 199 | 1272 | 0.004880 | 0.004974 |
| T15_S50A | 0.025 | 5.0 | 126 | 1270 | 0.043760 | 0.042429 |

TABLE 1-continued

Lasing conditions and selected results for coupon DOE

| Test | Thickness | Spot Size | Velocity | Power | Integrand | Angle |
|---|---|---|---|---|---|---|
| T16_S50A | 0.025 | 5.0 | 178 | 1270 | 0.010640 | 0.011676 |
| T17_S55A | 0.025 | 5.5 | 144 | 1272 | 0.020480 | 0.018588 |
| T18_S55A | 0.025 | 5.5 | 195 | 1272 | 0.010800 | 0.010105 |
| T19_S60A | 0.025 | 6.0 | 125 | 1273 | 0.010560 | 0.010699 |
| T21_S60A | 0.025 | 6.0 | 199 | 1270 | 0.005600 | 0.005533 |
| T22_S50B | 0.064 | 5.0 | 144 | 1262 | 0.005500 | 0.005725 |
| T23_S50B | 0.064 | 5.0 | 157 | 1262 | 0.005813 | 0.006021 |
| T24_S50B | 0.064 | 5.0 | 200 | 1265 | 0.004938 | 0.004835 |
| T25_S55B | 0.064 | 5.5 | 125 | 1270 | 0.007094 | 0.007086 |
| T26_S55B | 0.064 | 5.5 | 182 | 1270 | 0.004750 | 0.004957 |
| T27_S55B | 0.064 | 5.5 | 182 | 1269 | 0.004719 | 0.004643 |
| T28_S55B | 0.064 | 5.5 | 182 | 1270 | 0.005719 | 0.005690 |
| T29_S60B | 0.064 | 6.0 | 130 | 1271 | 0.004875 | 0.005009 |
| T30_S60B | 0.064 | 6.0 | 149 | 1270 | 0.002750 | 0.002915 |
| T31_S60B | 0.064 | 6.0 | 199 | 1268 | 0.004000 | 0.003997 |
| T32_S50B | 0.064 | 5.0 | 144 | 1265 | 0.006594 | 0.006842 |
| T33_S50B | 0.064 | 5.0 | 200 | 1265 | 0.006250 | 0.006213 |
| T34_S55B | 0.064 | 5.5 | 125 | 1268 | 0.005094 | 0.004939 |
| T35_S60B | 0.064 | 6.0 | 130 | 1268 | 0.006406 | 0.006196 |
| T36_S60B | 0.064 | 6.0 | 199 | 1268 | 0.003531 | 0.003229 |
| T37_S50B | 0.064 | 5.0 | 144 | 1260 | 0.004875 | 0.005009 |
| T38_S50B | 0.064 | 5.0 | 200 | 1265 | 0.004344 | 0.004660 |
| T39_S55B | 0.064 | 5.5 | 125 | 1270 | 0.004469 | 0.005079 |
| T40_S60B | 0.064 | 6.0 | 130 | 1270 | 0.005250 | 0.005306 |
| T41_S60B | 0.064 | 6.0 | 199 | 1270 | 0.002469 | 0.002810 |
| T43_S50C | 0.100 | 5.0 | 180 | 1262 | 0.003300 | 0.003752 |
| T44_S55C | 0.100 | 5.5 | 144 | 1264 | 0.004040 | 0.004538 |
| T45_S55C | 0.100 | 5.5 | 200 | 1270 | 0.002640 | 0.001955 |
| T46_S60C | 0.100 | 6.0 | 125 | 1250 | 0.001960 | 0.001571 |
| T47_S60C | 0.100 | 6.0 | 150 | 1250 | 0.001940 | 0.001920 |
| T48_S60C | 0.100 | 6.0 | 175 | 1248 | 0.002780 | 0.002967 |
| T49_S55C | 0.100 | 5.5 | 144 | 1268 | 0.004000 | 0.004468 |
| T50_S50C | 0.100 | 5.0 | 180 | 1264 | 0.003820 | 0.003700 |
| T51_S55C | 0.100 | 5.5 | 144 | 1267 | 0.002380 | 0.002199 |
| T52_S50C | 0.100 | 5.0 | 180 | 1262 | 0.002720 | 0.002688 |

The lasing direction was along the 1.0-inch dimension, one scan per coupon. In the example, the measuring of the shape of a test workpiece at block 124 comprised measuring the resulting thermal-formed surface profiles via a measuring device 102 comprising a non-contact metrology system. The measuring yield an ordered set of points on the lased-side coupon surface. The metrology data was captured in four distinct scans orthogonal to the lasing direction with 0.197-inch (5.0-mm) separation to capture an area 0.591-inch (15.0-mm) wide centered on the 1.0-inch dimension; thus, the scans were offset from the coupon edges by approximately 0.20-inch. The scans were 0.786-inch long. The initial geometries were not measured and were assumed to be planar, but initial non-planar geometries may be accommodated in the methodology. The coupons were pinned in place to a fixture during lasing and measurement. Any of a number of metrology techniques can be employed to determine the resulting surface geometries, and the techniques and results are not restricted to a chosen optical system.

In the experiment, the determination of the empirical strain field at block 126 comprised fitting a piecewise cubic polynomial surface in a least-squared sense to the metrology point set output for each coupon, based on the results found in Table 1. The surface was used to quantify the coupon-surface displacement from the original (in this case flat) configuration to the post-lased resting position. The resulting functional was used to construct boundary conditions used in a linear-elastic Finite Element Analysis (FEA) model to deform a model coupon (0.591 by 0.786 by one of 0.100, 0.064 or 0.025-inch thick) from the initial configuration to the final measured configuration in one step. The resulting equilibrated model was interrogated for surface strain measures such as principal strain directions, magnitudes and strain in the cross-lased direction. These surface strain measures may include a second (lowest or most compressive) principle strain component and a vector field showing directions of the local second principal strain. The results indicated an evolution of strain with increasing intensity from the entrance side to exiting side of the thermal forming treatment.

Examining the strain distribution in greater detail at a given position along the thermal forming treatment yields details of the local effects of the thermal forming. A detailed strain plot of a test tracks the 1st and 2nd principal strain components respectively and a [1,1] component of strain on the coupon surface in the direction orthogonal to the lasing, referred herein as $\epsilon_{11}$. The $\epsilon_{11}$ strain may capture the dominant curvature change in the workpiece due to a thermal treatment. Further, peak bending may not occur at the center of the lased region, but there may be a bi-modal response with maxim bending near the boundaries of the lased/un-lased region. Additionally, a region of slight reverse bending represented by a positive surface strain may also result just outside a zone of laser contact.

The surface $\epsilon_{11}$ strain may be useful to quantify a typical metric—the bend angle. This relationship between strain and bend angle may be derived by considering arc lengths measured in the plane of the bend, and with the observation that these strains are sufficiently small a very simple relationship results. In the experiment, the determination of the empirical transfer function at block 128 comprised, integrating strain as a local measure of deformation along a path orthogonal to the lasing direction resulting in the bend angle as follows:

$$-\int_{-l/2}^{l/2} \frac{\epsilon_{11}}{z} \cdot dx = \theta \quad [1]$$

where l is the length of the affected zone, z is ½ the thickness (at the surface) and θ is the bend angle in radians. This quantity may be calculated from the FEA model output discussed above. For example, this integrand may be calculated from the scanned/modeled strain plotted against the bend angle measured directly. Such a calculation of the integrand may yield a substantially linear relationship between the bend angle and the integrand with excellent correlation results. For example a correlation having a $R^2$ adjusted value of 99.27% was achieved in the experiments discussed herein.

Further, a cubic regression model may be fit to the DOE process data to predict the integrand of Equation 1 using a Design For Six Sigma (DFSS) tools. The cubic regression model may be of the following form:

integrand=θ=f(thick, spot, power, vel)  [2]

where the results and model coefficients are listed in Table 2 below and show an $R^2$ adjusted value of 94.99%.

TABLE 2

Regression Analysis Results for the Prediction of the Integrand of Equation 1.

| Variable | Actual Coefficient | p | Interpretation |
|---|---|---|---|
| Constant | −1.782E+04 | 1.183E−01 | |
| Thickness | 5.149E+01 | 3.768E−01 | Insignificant |
| spot size | −4.972E+02 | 8.197E−01 | Insignificant |
| Velocity | 3.079E+00 | 2.447E−02 | Significant |

TABLE 2-continued

Regression Analysis Results for the Prediction of the Integrand of Equation 1.

| Variable | Actual Coefficient | p | Interpretation |
|---|---|---|---|
| Power | 4.408E+01 | 2.182E−01 | Insignificant |
| thickness * spot size | −1.123E+01 | 1.913E−02 | Significant |
| thickness * velocity | 8.856E−02 | 7.465E−03 | Significant |
| thickness * Power | −1.860E−02 | 2.989E−02 | Significant |
| spot size * velocity | 5.291E−02 | 7.638E−03 | Significant |
| spot size * Power | 7.814E−01 | 3.254E−01 | Insignificant |
| velocity * Power | −5.129E−03 | 3.235E−03 | Significant |
| thickness^2 | −1.019E+02 | 1.959E−02 | Significant |
| spot size^2 | −2.333E−02 | 2.050E−04 | Significant |
| velocity^2 | 1.211E−04 | 2.768E−01 | Insignificant |
| Power^2 | −3.626E−02 | 2.171E−01 | Insignificant |
| thickness * spot size * velocity | −1.736E−02 | 8.739E−08 | Significant |
| spot size * velocity * Power | −4.086E−05 | 3.006E−02 | Significant |
| thickness^2 * spot size | 2.390E+01 | 2.912E−03 | Significant |
| thickness^2 * velocity | −1.516E−01 | 3.934E−04 | Significant |
| spot size^2 * thickness | 1.059E+00 | 8.989E−03 | Significant |
| velocity^2 * thickness | 8.633E−05 | 3.429E−02 | Significant |
| Power^2 * spot size | −3.069E−04 | 5.338E−03 | Significant |
| Power^2 * velocity | 2.114E−06 | 3.324E−03 | Significant |
| velocity^3 | −2.572E−07 | 9.958E−03 | Significant |
| Power^3 | 9.922E−06 | 5.248E−03 | Significant |
| Std Err | 0.002 | | |
| R-sq | 97.45% | | |
| R-sq(adj) | 94.99% | | |
| R-sq(pred) | 91.11% | | |

These data may be used to probe the process space not explicitly tested in the DOE. If these data are used to probe the process space not explicitly tested in the DOE, interpolation may be used based on these data.

In the example, the empiric-numeric derived strain distributions discussed above may be used to predict the thermal forming treatment(s) available to achieve a desired outcome in shape. Thus, an inverse style model may predict paths and conditions for thermal forming treatment(s) available to achieve a given desired configuration, microstructure and/or properties in the workpiece. In the following example, the prediction of one or more thermal forming treatments at block 140 may comprise an inverse style model expressed generally as the function:

$$g(X^0, X^1, \Psi^0, \Psi^1, \Theta^0, \Theta^1) = \text{power, spot size, velocity, etc.} \quad [3]$$

where $X^0$ and $X^1$ are the initial and final geometric configuration, respectively, and where $\Psi^1$ and $\Theta^1$ are the resulting microstructure and properties, respectively. The empiric-numeric strain results above may provide a bridge between experimental data—typically measured in terms of bend angle, and the modeling data, typically cast in terms of strain. The strain data may be used to directly map thermal forming process parameters to deformation fields through an inversion of the polynomial transfer function of Table 2. The determination of paths and heating conditions of a thermal forming treatment may be done as discrete activities. Discrete activity strain fields may be interrogated for path determination considering only the directions of principal strain, and once paths are satisfactorily determined, heating conditions may then be calculated. Alternatively, a coupled or simultaneous rather than discrete determination of scanning paths and heating conditions of a thermal forming treatment may be performed.

During an example thermal forming treatment a current configuration of a workpiece may be obtained. In the following example, the measuring of the workpiece initial shape at block 132 may comprise using a laser optical scanner, such as measuring device 102, to obtain a dense point set of the surface. In the example, the determination of the strain field at block 134 may comprise interrogating the surface configuration to determine surface boundary conditions that may be used to perform a one-step elastic FEA analysis from the measured initial shape to the desired shape. FEA boundary conditions may be developed such that the one-step mapping is from nominal shape to deformed shape—the inverse of CAD type mapping which may be rectified by inverting the resulting strain solution.

The mapped strain may be interrogated on outer and mid surfaces and decomposed into principal components for both direction and values of strain. In the example, the setting of starting location and/or starting direction at block 136 may comprise using an identified location of maximum compressive strain as a starting location to determine the thermal scan trajectory along the surface; additionally or alternatively, the thermal forming treatment of the workpiece may traverse orthogonal to the second principal direction of strain through the location of maximum compressive strain.

In the example, the manipulation of an equivalent affected zone spacing at block 138 may comprise guessing an initial equivalent affected zone spacing l' at each location along the thermal scanning trajectory and/or modulating the parameter l' to assist in predicting one or more thermal forming treatments. This parameter l' is closely related to the parameter l in Equation 1, which quantifies the width (or length in the orthogonal-to-scan direction) of the bend-affected zone. Since the end result of thermal forming treatment is to produce gross shape change and this shape change must typically be realized over regions much larger than that of the bend-affected zone, then many alternative affected zone spacings may achieve the same or substantially similar change in curvature. For example, Equation 1 may be combined with the results of the DOE transfer function in Table 2 (or the inverse function). Over a region of interest, we have from Equation 1:

$$\theta = \text{constant} - \int_{-l/2}^{l/2} \frac{\varepsilon_{11}}{z} \cdot dx = -\int_{-l'/2}^{l'/2} \frac{\varepsilon'_{11}}{z} \cdot dx \quad [4]$$

which states that an alternate strain $\varepsilon'_{11}$ and width l' exists that will achieve the same result as $\varepsilon_{11}$ and l; i.e. more acute bending over a smaller region or shallower bending over a greater region may be substantially equivalent. Combined with the above-mentioned inverse functional of Equation 2, the equivalence becomes (over a region of interest) an equivalence of process parameters:

{power, spot size, velocity, l}={power', spot size', velocity', l'}  [5]

where to affect a desired shape change in a workpiece, a multiplicity of process parameters may be available to choose from. The microstructural and geometric database information may indicate that to achieve the desired curvature, a very aggressive heating schedule is required—one that may have a high probability of introducing microstructural damage. More favorable heating conditions may be found by altering the equivalent affected zone spacing and re-querying the inverse functional for probable outcome. Thus, the possibility may exist to achieve the desired curvature under more favorable conditions afforded by lower (or maybe even higher) spacing, l'. The manipulation of equivalent affected zone spacing may also be used to optimize other aspects of interest such as to minimize bending angle variance. Flexibility may also be afforded by simultaneously calculating two or more of the following: affected zone spacing, thermal scan trajectory, or heating conditions, or combinations thereof to accommodate the various microstructural and system constraints.

With the starting location and path determined, the particular heating conditions may also be determined. As discussed a multiplicity of solutions or no solution for particular heating conditions possibly exist. In the example, the prediction of one or more thermal forming treatments at block 140 may comprise setting limits on thermal scanning velocity based on performance of the system components used. For example, a limit on thermal scanning velocity may be set between 140 and 200 mm/s, where the upper limit may be set because a robot carrying the workpiece across the path of the laser has best performance below 200 mm/s. Further, DOE surface and microstructural evaluation may restricts the lower limit, for example to 140 mm/s. Laser power may be fixed to avoid difficulties of modulating laser output along a trajectory, although the scope of the claimed subject matter is not limited in this respect.

In the example, the prediction of one or more thermal forming treatments at block 140 may comprise integrating strain in a transverse direction. For example, Gaussian integration may be used. Where Gaussian integration is used for the case of 5-point quadrature, the surface may be found at the Gaussian locations of approximately +/−0.91, +/−0.54 and 0 of ½ l'. Runge Kutta integration may then be used along the typically non-planar surface. The contribution to second principal strain is calculated as in Equation 6 below:

accumulated strain=

$$-\sum_{i=1, ngauss} \frac{\varepsilon_2^i}{z^i} |\dot{\varepsilon}_2^i \cdot \hat{t}| \cdot w^i \quad [6]$$

where t is a unit vector in the transverse direction; $\varepsilon_2^i$ and $\epsilon_2^i$ are for the i$^{th}$ quadrature point, the second principal strain direction, and value respectively, and where $w^i$ are the weights. The strain herein considered can be both bending or in plane by evaluating the outer surface and corresponding middle surface values. An average thickness on an integration domain may be calculated. For example, a Gaussian integration scheme similar to the integration scheme for accumulated strain may be used. If possible given constraints, a thermal forming treatment may be predicted with a solved thermal power, thermal spot size, or thermal scan velocity, or combinations thereof. For example, a Newton Raphson iteration scheme may be used to solve the predicted thermal power, thermal spot size, or thermal scan velocity, or combinations thereof. The target strain may be calculated in Equation 6, where F (thermal power, thermal spot size, thermal scan velocity)=0 may be sought where F=f (workpiece thickness, thermal power, thermal spot size, thermal scan velocity)−target strain.

In the example, the determination of whether the thermal forming treatment within tolerances at block 142 may comprise continuing calculation along the trajectory if a solution is found within the given tolerances; additionally or alternatively, if no solution is found, a manipulation to the equivalent affected zone spacing, l', may be made prior to recalculating.

In the example, the manipulation of an equivalent affected zone spacing at block 138 may comprise using the DOE data to guide a next guess of equivalent affected zone spacing, l'. The target accumulated strain may be in the range of strain developed in the DOE, however because the accumulated strain may be obtained once an equivalent length is determined, an iterative scheme such as found herein may be used.

Based at least in part on the foregoing disclosure, software may be produced capable of performing one or more of the above-described operations. It will also be understood that, although particular embodiments have just been described, the claimed subject matter is not limited in scope to a particular embodiment or implementation. For example, one embodiment may be in hardware, such as implemented to operate on a device or combination of devices, as previously described, for example, whereas another embodiment may be in software. Likewise, an embodiment may be implemented in firmware; or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method, comprising:
   measuring at least the surface of a workpiece;
   determining a strain field based at least in part on said measuring of at least the surface of said workpiece;
   predicting one or more thermal forming treatments for a workpiece to achieve a desired shape and/or micro structure in said workpiece based at least in part on said determining of the strain field;
   performing a thermal forming treatment on at least one workpiece prior to said measuring of at least the surface of said workpiece, wherein said determining of the strain field results in an empirical strain field; and
   determining an empirical transfer function relating one or more process inputs to bend angle based at least in part on said empirical strain field.

2. The method of claim 1, wherein said determining of the strain field is based at least in part on comparing an initial shape of said workpiece to a desired shape of said workpiece.

3. The method of claim 1, further comprising:
   determining a location of maximum compressive strain based at least in part on the strain field.

4. The method of claim 3, wherein said predicting of one or more thermal forming treatments comprises setting a starting location for a thermal scan trajectory based at least in part on the location of maximum compressive strain.

5. The method of claim 3, wherein said predicting of one or more thermal forming treatments comprises setting a starting direction for a thermal scan trajectory based at least in part on the location of maximum compressive strain.

6. The method of claim 1, wherein said predicting of one or more thermal forming treatments comprises using an equivalent measure, wherein the equivalent measure comprises one or more of the following: equivalent curvature, equivalent bend angle, equivalent local strain, or equivalent affected zone spacing, or combinations thereof.

7. The method of claim 6, wherein said predicting of one or more thermal forming treatments further comprises manipulating the equivalent measure during said predicting of one or more thermal forming treatments.

8. The method of claim 7, wherein said predicting of one or more thermal forming treatments further comprises calculating one or more or the following: thermal power, thermal spot size, thermal scan velocity, or scan path, or combinations thereof, based at least in part on a guessed equivalent affected zone spacing.

9. The method of claim 1, wherein said predicting of one or more thermal forming treatments comprises simultaneously calculating two or more or the following: affected zone spacing, thermal scan trajectory, or heating conditions, or combinations thereof.

10. The method of claim 1, wherein said determining comprises determining an empirical transfer function relating one or more of the following: thermal power, thermal spot size, thermal scan velocity, scan path, workpiece thickness, or affected zone spacing, or combinations thereof.

11. The method of claim 10, wherein said predicting of one or more thermal forming treatments comprises calculating one or more or the following: thermal power, thermal spot size, thermal scan velocity, or scan path, or combinations thereof, based at least in part on said empirical transfer function.

12. A method, comprising:
   performing a thermal forming treatment on at least one workpiece;
   measuring at least a surface of a workpiece;
   determining an empirical strain field based at least in part on said measuring of at least the surface of said workpiece;
   determining an empirical transfer function relating one or more process inputs to bend angle based at least in part on said empirical strain field;
   predicting one or more thermal forming treatments for the workpiece to achieve a desired shape and/or microstructure in said workpiece, wherein said predicting is based at least in part on said empirical transfer function; and
   manipulating an equivalent affected zone spacing during said predicting of one or more thermal forming treatments to calculate one or more or the following: thermal power, thermal spot size, thermal scan velocity, or scan path, or combinations thereof.

13. The method of claim 12, further comprising:

determining a location of maximum compressive strain based at least in part on the strain field.

14. The method of claim 13, wherein said predicting of one or more thermal forming treatments comprises setting a starting location for a thermal scan trajectory based at least in part on the location of maximum compressive strain.

15. The method of claim 13, wherein said predicting of one or more thermal forming treatments comprises setting a starting direction for a thermal scan trajectory based at least in part on the location of maximum compressive strain.

16. The method of claim 12, wherein said predicting of one or more thermal forming treatments comprises using an equivalent measure, wherein the equivalent measure comprises one or more of the following: equivalent curvature, equivalent bend angle, or equivalent local strain, or combinations thereof.

17. The method of claim 12, wherein said predicting of one or more thermal forming treatments comprises simultaneously calculating two or more or the following: affected zone spacing, thermal scan trajectory, or heating conditions, or combinations thereof.

* * * * *

UNITED STATES PATENT AND TRADEMARK OFFICE
CERTIFICATE OF CORRECTION

PATENT NO. : 7,412,300 B2
APPLICATION NO. : 11/364233
DATED : August 12, 2008
INVENTOR(S) : Mika et al.

It is certified that error appears in the above-identified patent and that said Letters Patent is hereby corrected as shown below:

On the Title Page, in Field (52), under "U.S. Cl.", in Column 1, Line 2, delete "148/610" and insert -- 148/510 --, therefor.

In Column 4, Line 65, delete "fictional" and insert -- functional --, therefor.

In Column 10, Line 44, delete " $\epsilon_2^i$ " and insert -- $\hat{\epsilon}_2^i$ --, therefor.

Signed and Sealed this

Twenty-sixth Day of May, 2009

JOHN DOLL
*Acting Director of the United States Patent and Trademark Office*